(12) United States Patent
Saneyoshi et al.

(10) Patent No.: US 11,848,625 B2
(45) Date of Patent: Dec. 19, 2023

(54) ELECTROSTATIC ACTUATOR

(71) Applicant: STRAWB Inc., Kanagawa (JP)

(72) Inventors: Keiji Saneyoshi, Kanagawa (JP); Kazuo Okuda, Kanagawa (JP)

(73) Assignee: STRAWB INC., Kanagawa (JP)

( * ) Notice: Subject to any disclaimer, the term of this patent is extended or adjusted under 35 U.S.C. 154(b) by 65 days.

(21) Appl. No.: 17/619,328

(22) PCT Filed: Jun. 17, 2020

(86) PCT No.: PCT/JP2020/023659
§ 371 (c)(1),
(2) Date: Dec. 15, 2021

(87) PCT Pub. No.: WO2020/255977
PCT Pub. Date: Dec. 24, 2020

(65) Prior Publication Data
US 2022/0368248 A1 Nov. 17, 2022

(30) Foreign Application Priority Data

Jun. 18, 2019 (JP) ................................ 2019-112669

(51) Int. Cl.
*H02N 1/08* (2006.01)
*H02N 1/00* (2006.01)
(52) U.S. Cl.
CPC .............. *H02N 1/002* (2013.01); *H02N 1/08* (2013.01)
(58) Field of Classification Search
CPC ........... H02N 1/00; H02N 1/002; H02N 1/006
See application file for complete search history.

(56) References Cited

U.S. PATENT DOCUMENTS

| 4,330,730 A | 5/1982 | Kurz et al. |
| 2003/0117044 A1 | 6/2003 | Urano et al. |

(Continued)

FOREIGN PATENT DOCUMENTS

| DE | 4127860 A1 | 2/1993 | |
| EP | 2136417 A2 * | 12/2009 | ......... H01L 41/0471 |

(Continued)

OTHER PUBLICATIONS

International Search Report issued in PCT/JP2020/023659 dated Sep. 8, 2020.

*Primary Examiner* — Burton S Mullins
(74) *Attorney, Agent, or Firm* — SNELL & WILMER L.L.P.

(57) ABSTRACT

The present invention is directed to providing an electrostatic actuator that can generate a large electrostatic force even if composed of a ribbon-shaped electrode film.
In an electrostatic actuator 10, 20 including a ribbon-shaped first electrode film 11 and a ribbon-shaped second electrode film 12, a plurality of first electrodes 1 formed of the first electrode film 11 and a plurality of second electrodes 2 formed of the second electrode film 12 are folded and laminated between one end 13 and the other end 14 of the electrostatic actuator 10, 20, and the plurality of first electrodes 1 include a pair of end electrodes 1a that are adjacent to each other in a direction in which the first electrode film 11 extends in a ribbon shape and are respectively positioned at the one end 13 and the other end 14 when laminated and at least one intermediate electrode 1b that is positioned between the end electrodes 1a when laminated.

6 Claims, 10 Drawing Sheets

(56) References Cited

U.S. PATENT DOCUMENTS

2018/0294743 A1 10/2018 Saneyoshi et al.
2021/0146401 A1 5/2021 Nakata et al.

FOREIGN PATENT DOCUMENTS

| EP | 2136418 A2 | * | 12/2009 | ........... H01L 41/083 |
|----|---|---|---|---|
| JP | 2001268948 A | * | 9/2001 | ............... H02N 1/00 |
| JP | 2003199365 A | | 7/2003 | |
| JP | 2008211922 A | | 9/2008 | |
| JP | 2010057320 A | * | 3/2010 | ............... H02N 1/00 |
| JP | 2010057321 A | | 3/2010 | |
| JP | 2017022926 A | | 1/2017 | |
| JP | 2017158366 A | | 9/2017 | |
| WO | WO 2007029275 A1 | * | 3/2007 | ........... H01L 41/083 |
| WO | WO 2017037230 A1 | * | 3/2017 | ........... H01L 41/083 |
| WO | 2018207707 A1 | | 3/2020 | |
| WO | WO 2021251073 A1 | * | 12/2021 | ............... H02N 1/00 |

\* cited by examiner

ELECTROSTATIC ACTUATOR

CROSS-REFERENCE TO RELATED APPLICATIONS

This application is a national stage application of PCT/JP2020/023659, filed on Jun. 17, 2020, entitled "ELECTROSTATIC ACTUATOR," which claims priority to JP Application No. 2019-112669, filed on Jun. 18, 2019, both of which are hereby incorporated by reference in their entirety for all purposes.

TECHNICAL FIELD

The present invention relates to an electrostatic actuator.

BACKGROUND ART

Conventionally, an electrostatic actuator using a generation force based on an electrostatic attractive force to be generated between electrodes as a driving force has been known (see, e.g., PTL 1). In this type of electrostatic actuator, the area of each of the electrodes needs to be increased to obtain a large generation force because the generation force is proportional to the area of the electrode.

In an electrostatic actuator configured by folding two ribbon-shaped electrode films, an electrode section of each of the ribbon-shaped electrode films is thickened and a hinge section thereof is thinned, thereby realizing a spring characteristic in which the electrostatic actuator is soft in a driving region where it contracts when a voltage is applied thereto and the electrostatic actuator is hard in an overload region where it extends when a large load is applied thereto.

CITATION LIST

Patent Literature

PTL 1: Japanese Patent Laid-Open No. 2017-22926

SUMMARY OF INVENTION

Technical Problem

However, the electrostatic actuator configured by folding the two ribbon-shaped electrode films according to the above-described conventional technique has a paper spring-shaped structure. Accordingly, although a long stroke can be obtained, a large electrostatic force is difficult to generate.

An object of the present invention is to solve a problem of the above-described conventional technique, and to provide an electrostatic actuator that can generate a large electrostatic force even if composed of a ribbon-shaped electrode film.

Solution to Problem

The present invention provides an electrostatic actuator including a ribbon-shaped first electrode film and a ribbon-shaped second electrode film, in which a plurality of first electrodes formed of the first electrode film and a plurality of second electrodes formed of the second electrode film are folded and laminated between one end and another end of the electrostatic actuator, and the plurality of first electrodes include a pair of end electrodes that are adjacent to each other in a direction in which the first electrode film extends in a ribbon shape and are respectively positioned at the one end and the other end when laminated and at least one intermediate electrode that is positioned between the end electrodes when laminated.

In this case, the first electrode film may be repeatedly folded in the same direction in a direction to extend in a ribbon shape so that the at least one intermediate electrode is formed between the paired end electrodes. The first electrode film may be repeatedly folded in the same direction in a direction to extend in a ribbon shape so that the plurality of intermediate electrodes are formed to overlap one another. The at least one intermediate electrode may be alternately mountain-folded and valley-folded in a direction to extend in a ribbon shape so that the plurality of first electrodes are formed to overlap one another. The second electrode film may be alternately mountain-folded and valley-folded in a direction to extend in a ribbon shape so that the plurality of second electrodes each passing between the first electrodes formed of the first electrode film are formed. A distal end of the first electrode film may be bonded to the second electrode film at an intermediate position between the one end and the other end.

Advantageous Effects of Invention

The present invention can provide an electrostatic actuator that can generate a large electrostatic force even if composed of a ribbon-shaped electrode film.

DESCRIPTION OF EMBODIMENTS

Preferred embodiments of the present invention will be described below with reference to the drawings.

First Embodiment

Figure 1:
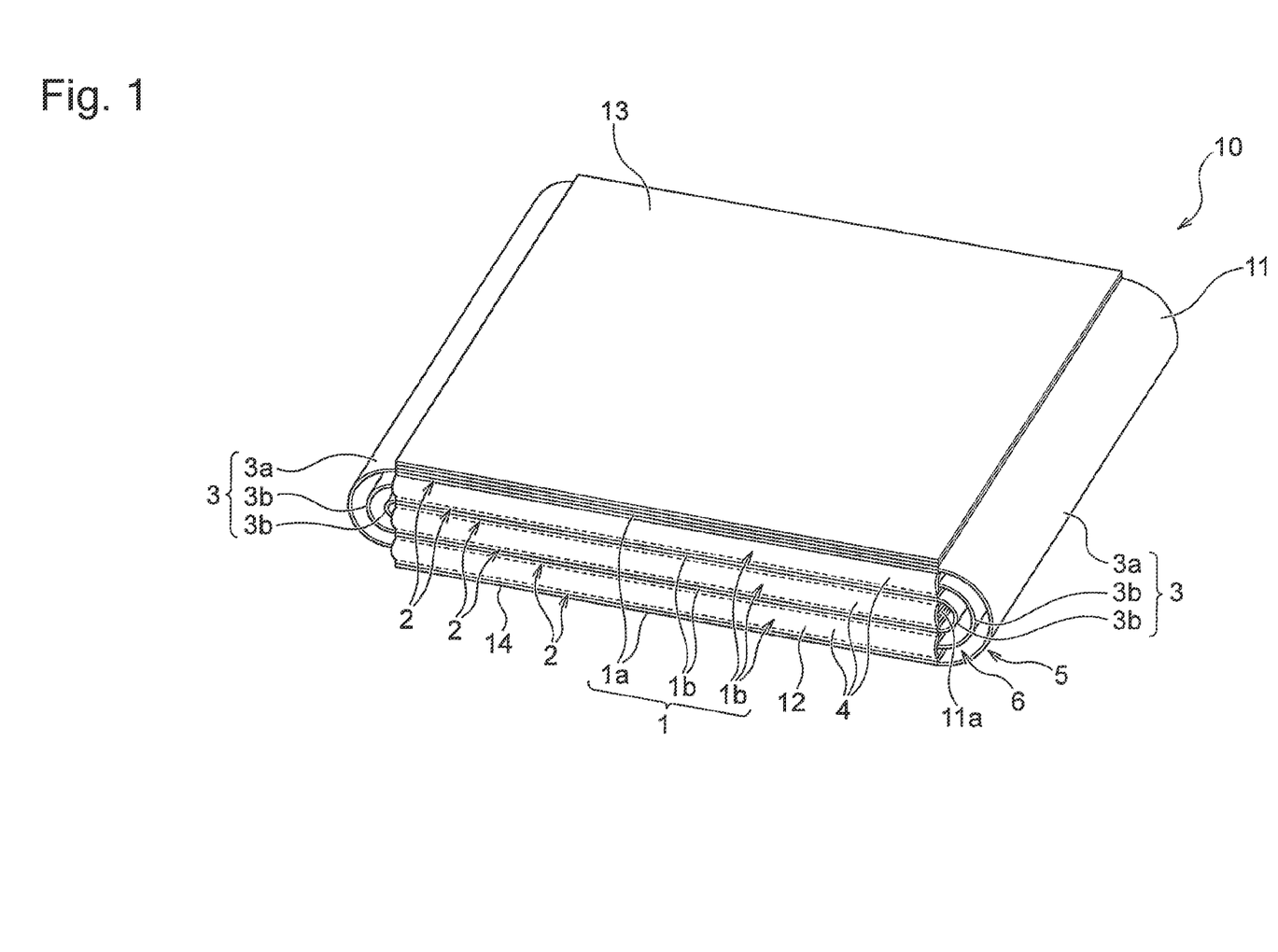
FIG. 1 is a perspective view of an electrostatic actuator according to a first embodiment.
Figure 2:
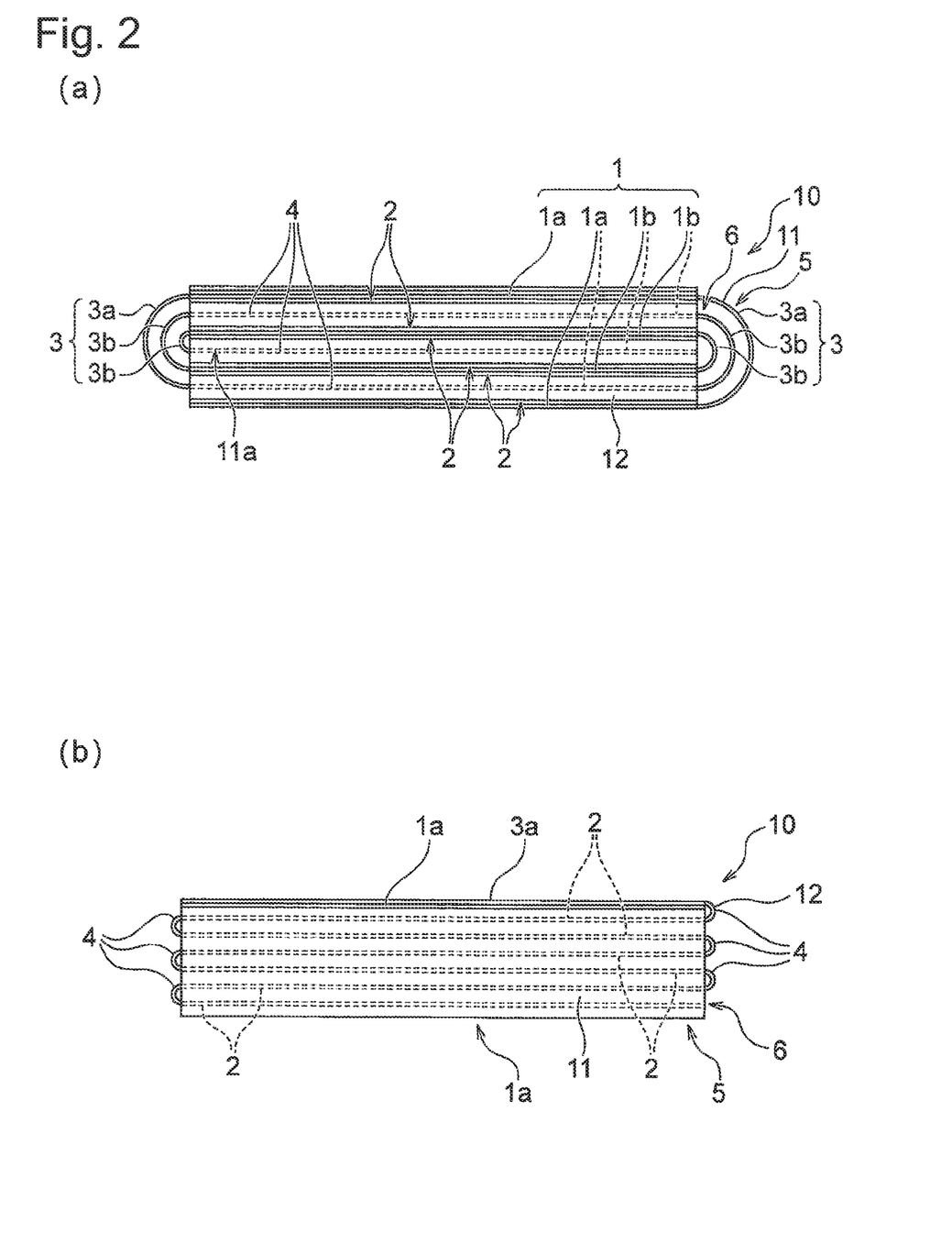
FIG. 2(a) is a front view of the electrostatic actuator.
FIG. 2(b) is a side view of the electrostatic actuator.

FIG. 1 is a perspective view of an electrostatic actuator according to a first embodiment. In FIG. 2, FIG. 2(a) is a front view of the electrostatic actuator, and FIG. 2(b) is a side view of the electrostatic actuator.

An electrostatic actuator 10 according to the present embodiment is a multilayer electrostatic actuator in which a ribbon-shaped first electrode film 11 and a ribbon-shaped second electrode film 12 are laminated by being folded and bonded, as illustrated in FIG. 1.

The first electrode film 11 and the second electrode film 12 are each a film-shaped electrode in which an electrical conductor is insulated with an electrical insulator and formed to be elongated in a ribbon shape. That is, the first electrode film 11 and the second electrode film 12 are formed in an elongated rectangular shape with the electrode films not folded. A copper foil, for example, is used for the electrical conductor, and PET (polyethylene terephthalate), for example, is used for the electrical insulator.

A stroke amount of the electrostatic actuator 10 is proportional to the number of laminated electrodes. Accordingly, when the plurality of electrodes are laminated, a long stroke can be obtained. In the electrostatic actuator 10, when a voltage is applied to the laminated first electrode film 11 and second electrode film 12, an electrostatic force is generated between the first electrode film 11 and the second electrode film 12. The entire electrostatic actuator 10 extends and contracts depending on a polarity of the voltage applied to the first electrode film 11 and the second electrode film 12.

A structure of the electrostatic actuator 10 according to the present embodiment will be specifically described below.

The electrostatic actuator 10 is formed by folding the ribbon-shaped first electrode film 11 and the ribbon-shaped second electrode film 12 between one end 13 and the other end 14 of the electrostatic actuator 10. As a result, the electrostatic actuator 10 has a structure in which a plurality of first electrodes 1 formed of the first electrode film 11 and a plurality of second electrodes 2 formed of the second electrode film 12 are laminated. The first electrodes 1 are connected to one another with a hinge section 3 that is a part of the first electrode film 11 similarly to the first electrodes 1. Similarly, the second electrodes 2 are connected to one another with a hinge section 4 that is a part of the second electrode film 12 similarly to the second electrodes 2.

The plurality of first electrodes 1 include a pair of end electrodes 1a and 1a and five intermediate electrodes 1b, as illustrated in FIG. 2(a).

The end electrodes 1a and 1a are respectively positioned at the one end 13 and the other end 14 of the electrostatic actuator 10 when the first electrode film 11 and the second electrode film 12 are laminated. The end electrodes 1a and 1a are formed on the first electrode film 11 such that they are adjacent to each other in a direction in which the first electrode film 11 extends in a ribbon shape, i.e., portions respectively corresponding to the intermediate electrodes 1b are not positioned between portions respectively corresponding to the end electrodes 1a and 1a in a straight ribbon-shaped state before the first electrode film 11 is folded.

The intermediate electrodes 1b are formed on the first electrode film 11 to be positioned between the end electrodes 1a and 1a when the first electrode film 11 and the second electrode film 12 are laminated.

The first electrode film 11 is repeatedly folded in the same direction in a direction to extend in a ribbon shape so that the intermediate electrodes 1b are formed between the paired end electrodes 1a and 1a. That is, the first electrode film 11 has a spirally wound shape as viewed from the side. The first electrode film 11 is further repeatedly spirally folded in the same direction in a direction to extend in a ribbon shape so that the plurality of intermediate electrodes 1b are formed to overlap one another.

In the electrostatic actuator 10, an outer section 5 constituted by the pair of end electrodes 1a coupled to each other with an outer hinge section 3a on the outer side and an inner section 6 constituted by the plurality of intermediate electrodes 1b coupled to one another with inner hinge sections 3b on the inner side are telescopically configured.

On the other hand, the second electrode film 12 is alternately mountain-folded and valley-folded in a direction in which the second electrode film 12 extends in a ribbon shape, as illustrated in FIG. 2(b). That is, the second electrode film 12 has a shape folded in a zigzag shape as viewed from the side. In the second electrode film 12, the six second electrodes 2 each passing between the first electrodes 1 in the first electrode film 11 are formed.

A distal end 11a (see FIG. 2(a)) of the first electrode film 11 is bonded to the second electrode film 12 at an intermediate position between the one end 13 and the other end 14 of the electrostatic actuator 10. That is, the first electrode film 11 and the second electrode film 12 are in a T shape by vertically bonding the distal end 11a of the first electrode film 11 to the center of the second electrode film 12 with the electrode films bonded to each other before being folded.

Figure 3:
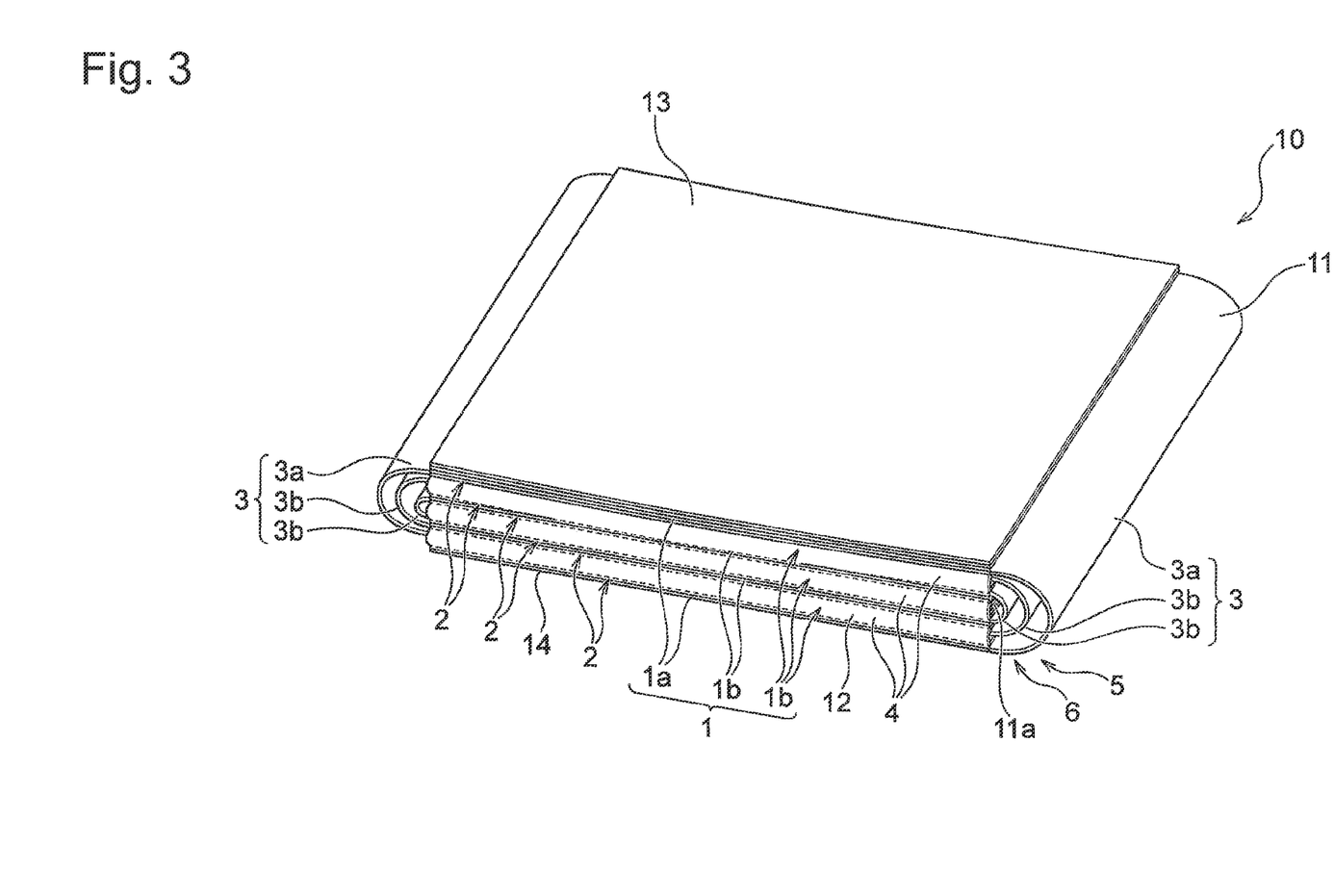
FIG. 3 is a perspective view illustrating how the electrostatic actuator has contracted.
Figure 4:
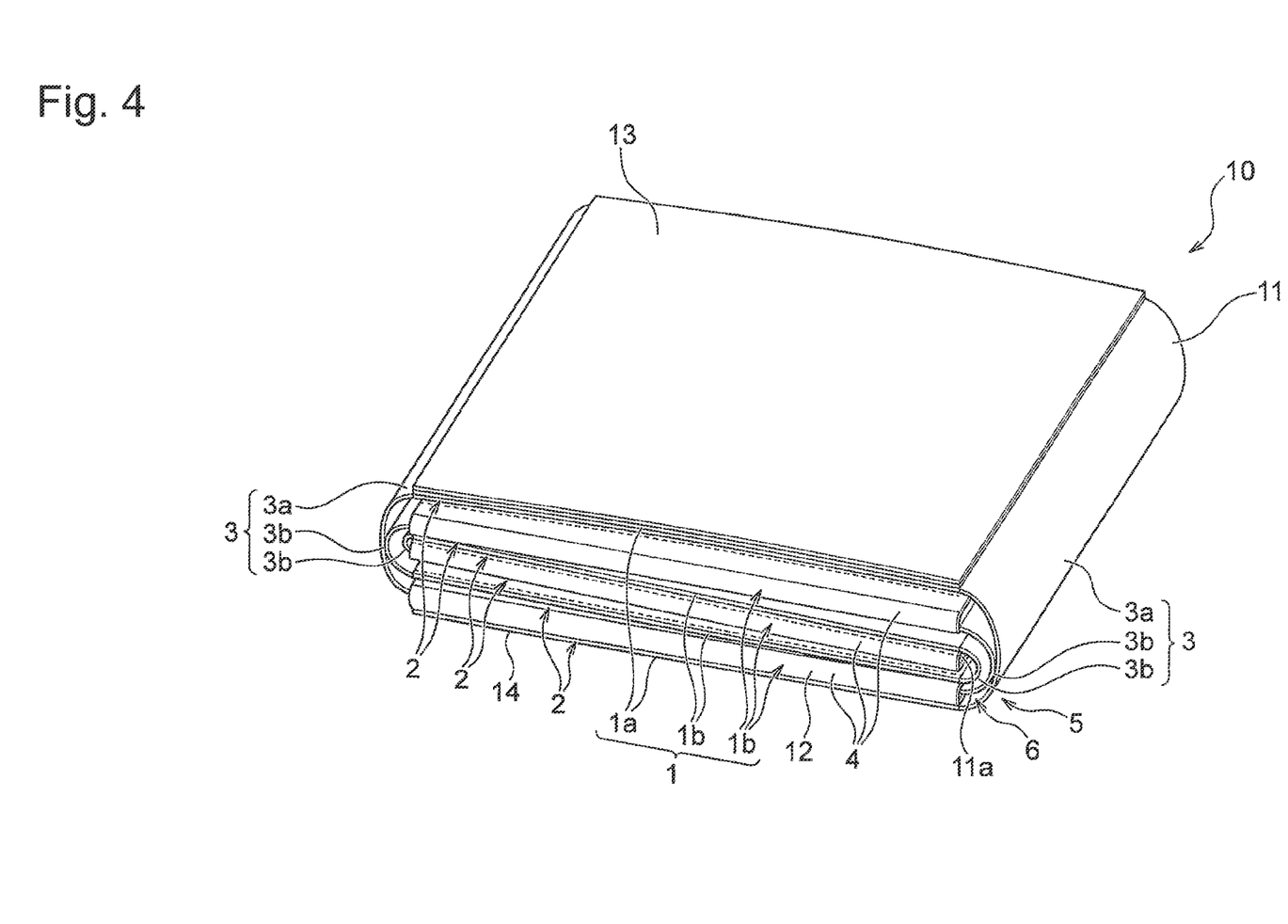
FIG. 4 is a perspective view illustrating how the electrostatic actuator has extended.

FIG. 3 is a perspective view illustrating how the electrostatic actuator has contracted, and FIG. 4 is a perspective view illustrating how the electrostatic actuator has extended. An example of a ribbon-shaped electrode film used for such a simulation is one having a width of 0.5 mm and having a thickness of 4 μm.

The electrostatic actuator 10 contracts by the first electrode 1 and the second electrode 2 being pulled with an electrostatic force, as illustrated in FIG. 3, when voltages having different polarities are respectively applied to the first electrode film 11 and the second electrode film 12.

On the other hand, the electrostatic actuator 10 extends with the first electrode 1 and the second electrode 2 repelling each other with an electrostatic force, as illustrated in FIG. 4, when voltages having the same polarity are respectively applied to the first electrode film 11 and the second electrode film 12.

Figure 5:
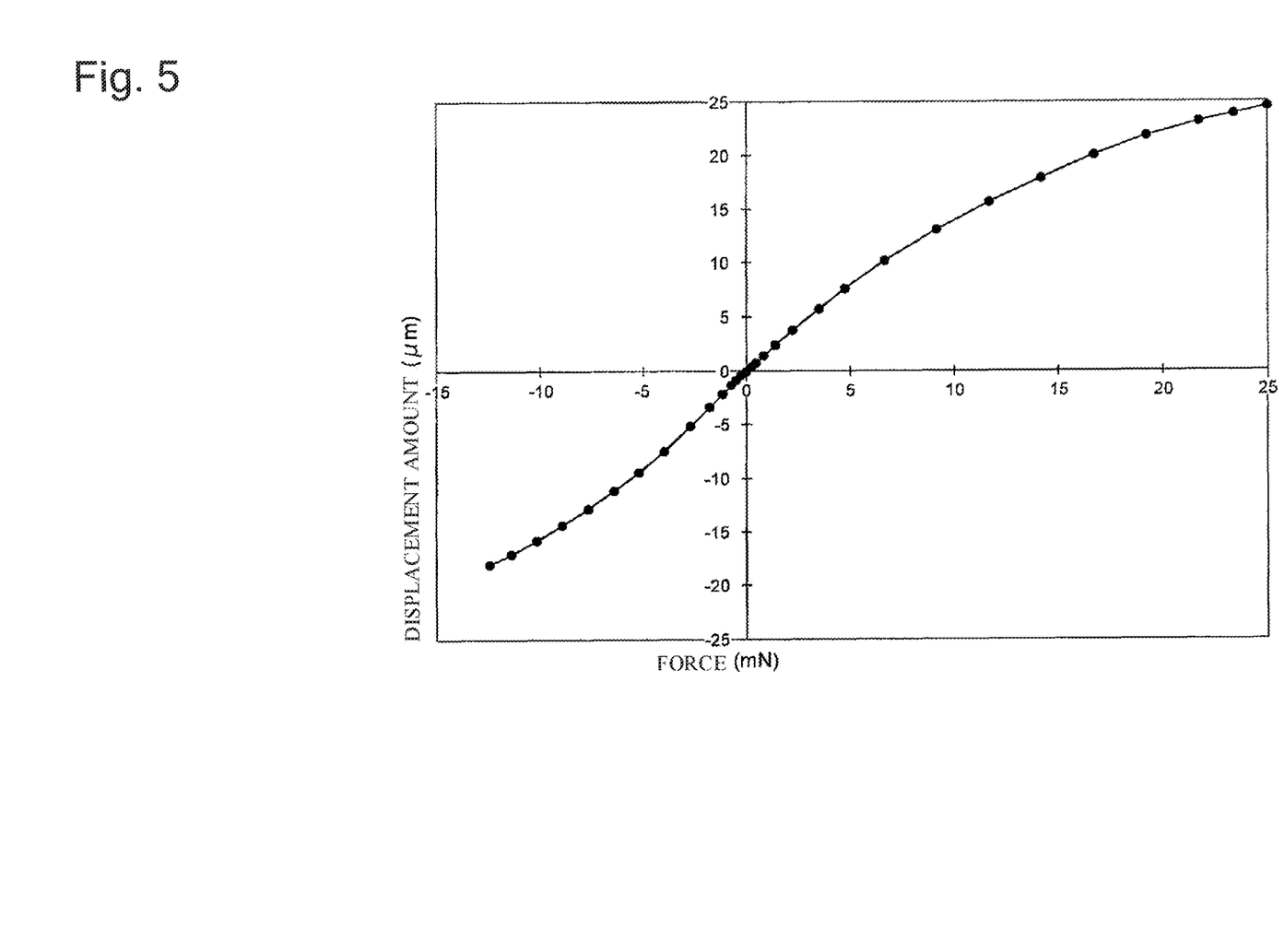
FIG. 5 illustrates a graph of a spring characteristic of the electrostatic actuator.

FIG. 5 illustrates a graph of a spring characteristic of the electrostatic actuator. In the figure, a vertical axis represents a spring constant in a unit of mN, and a horizontal axis represents a displacement amount at the one end 13 or the other end 14 in a unit of μm.

The electrostatic actuator 10 has a structure in which a spring constant is small in a driving region where a displacement amount at the one end 13 or the other end 14 is small and a spring constant is large in an overload region where a displacement amount at the one end 13 or the other end 14 is large, as illustrated in FIG. 5. An ideal spring characteristic, like in a disc spring, is obtained when a ratio of the spring constant in the driving region to the spring constant in the overload region is five times or more.

The electrostatic actuator 10 according to the present embodiment includes the pair of end electrodes 1a and 1a that are adjacent to each other in a direction in which the first electrode film 11 extends in a ribbon shape and are respectively positioned at the one end 13 and the other end 14 of the electrostatic actuator 10 when the pair of end electrodes 1a and 1a are laminated and the intermediate electrodes 1b that are positioned between the end electrodes 1a and 1a when the intermediate electrodes 1b are laminated. As a result, the spring characteristic in the overload region is greatly improved, and the ribbon-shaped electrode film can be thinned. Accordingly, even if the electrostatic actuator 10 is composed of the ribbon-shaped electrode film, a large electrostatic force can be generated.

Second Embodiment

Figure 6:
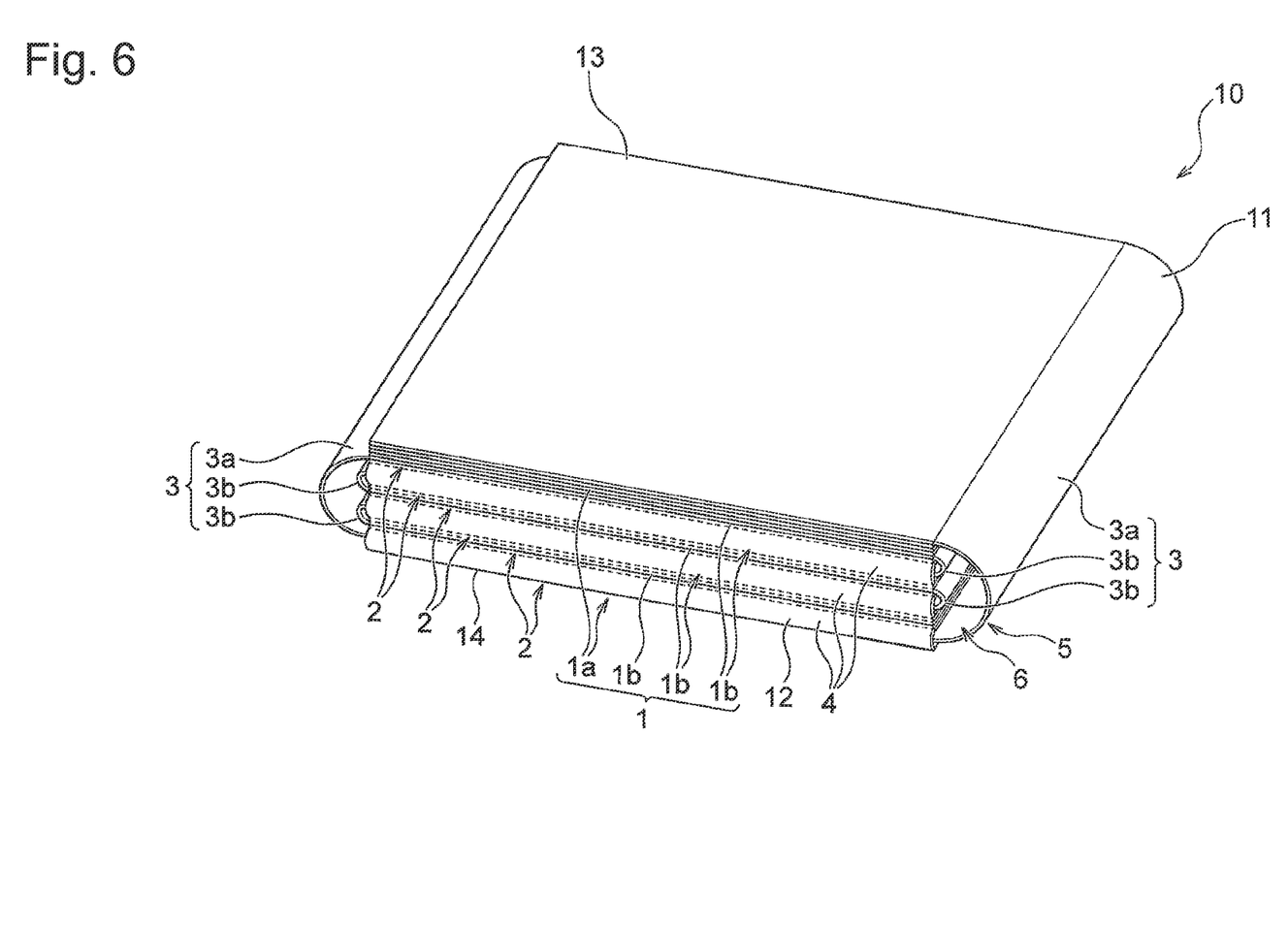
FIG. 6 is a perspective view of an electrostatic actuator according to a first embodiment.
Figure 7:
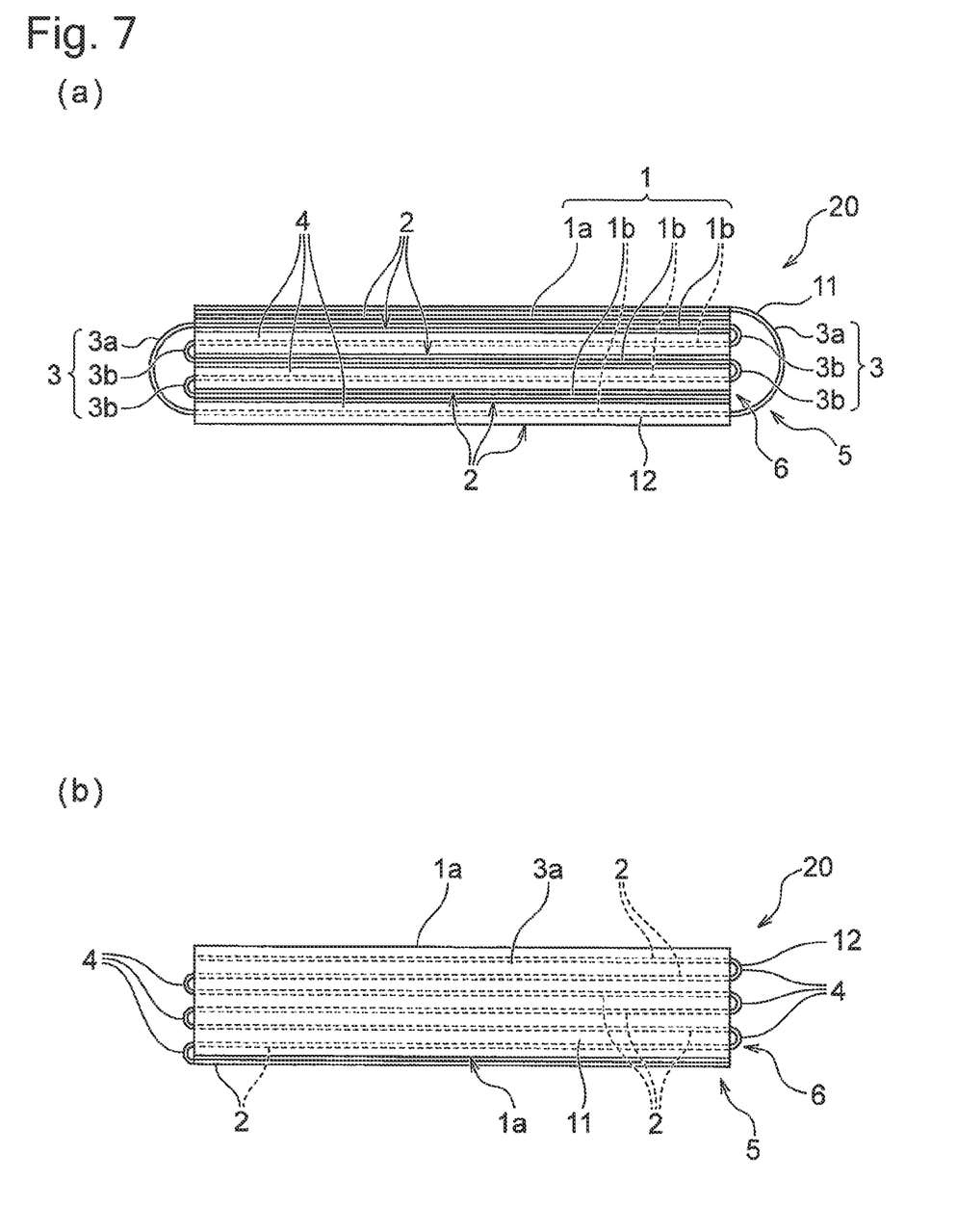
FIG. 7(a) is a front view of the electrostatic actuator.
FIG. 7(b) is a side view of the electrostatic actuator.

FIG. 6 is a perspective view of an electrostatic actuator according to a second embodiment, FIG. 7(a) is a front view of the electrostatic actuator according to the second embodiment, and FIG. 7(b) is a side view of the electrostatic actuator according to the second embodiment.

Hereinafter, description will be made using the same reference numerals, respectively, for substantially the same members as those in the first embodiment.

An electrostatic actuator 20 according to the second embodiment is the same as that in the first embodiment in an outer section 5 in a first electrode film 1 and differs from that in the first embodiment in an inner section 6 therein, as illustrated in FIG. 6. Specifically, in the electrostatic actuator 20 according to the second embodiment, a first electrode film 11 is alternately mountain-folded and valley-folded in a direction to extend in a ribbon shape in the inner section 6, as illustrated in FIG. 7(a). At this time, a second electrode film 12 is also alternately mountain-folded and valley-folded in a direction to extend in a ribbon shape, as illustrated in FIG. 7(b). Accordingly, intermediate electrodes 1b in the first electrode film 11 are configured to be alternately laminated away from second electrodes 2 in the second electrode film 12.

Figure 8:
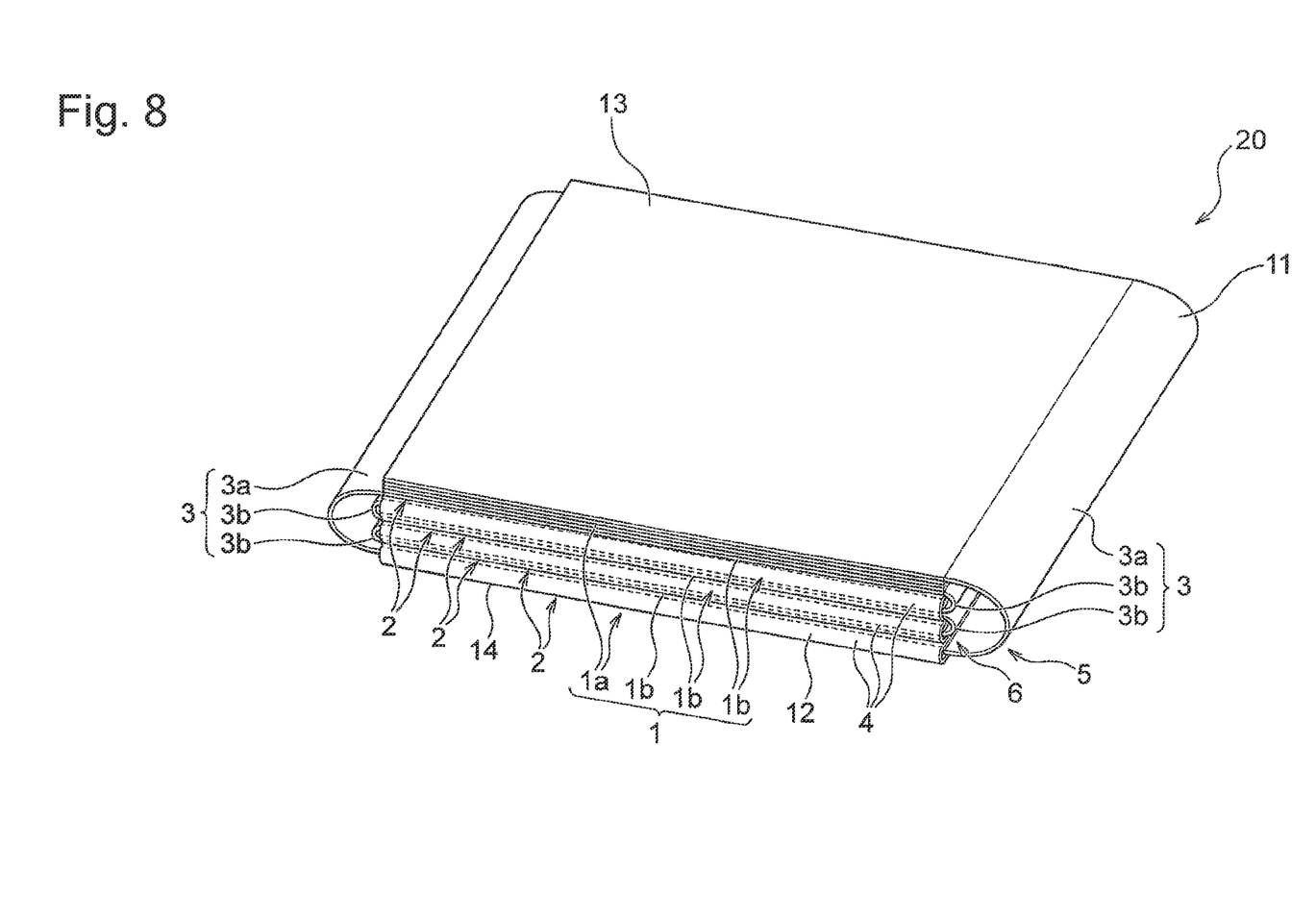
FIG. 8 is a perspective view illustrating how the electrostatic actuator has contracted.
Figure 9:
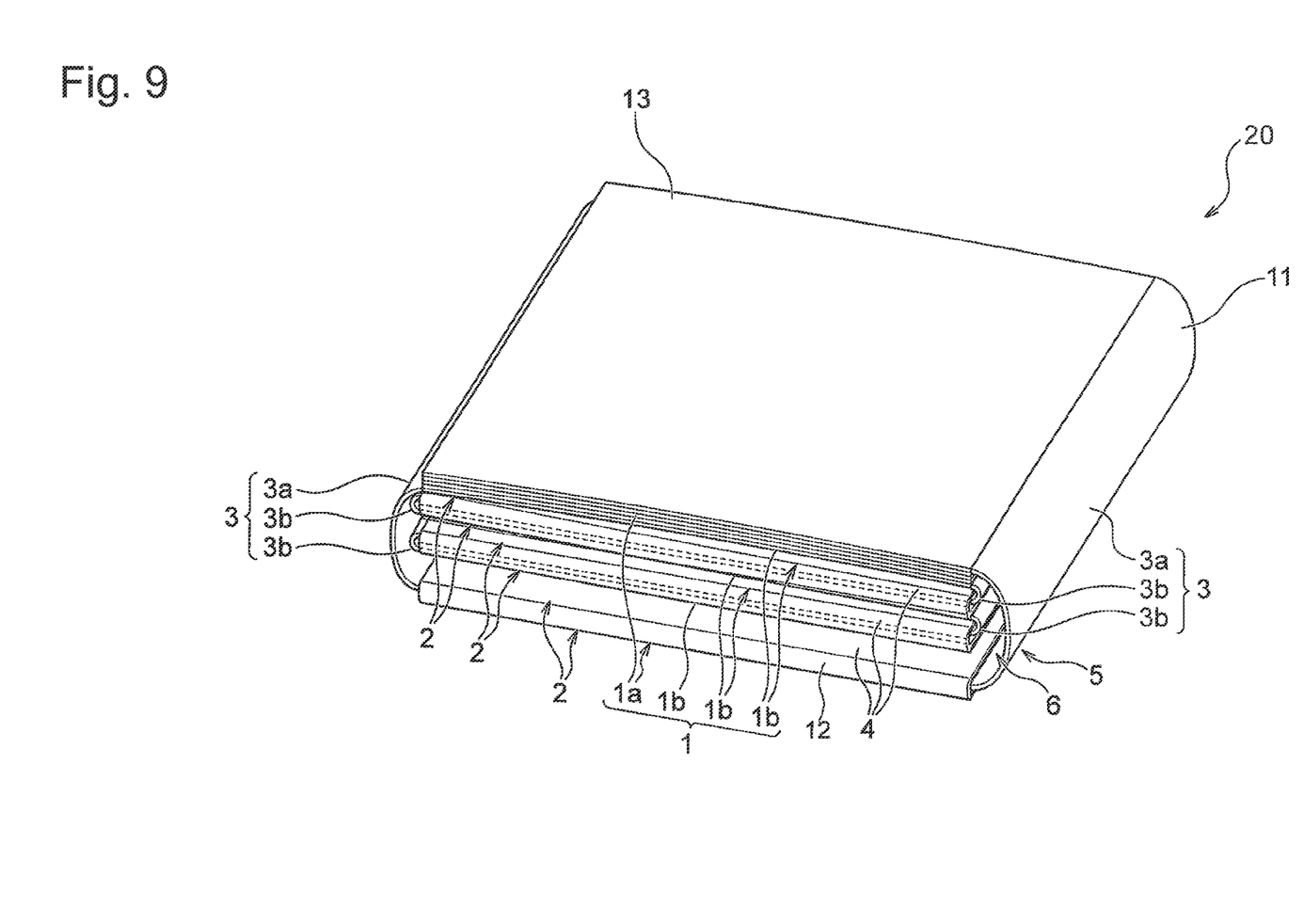
FIG. 9 is a perspective view illustrating how the electrostatic actuator has extended.

FIG. 8 is a perspective view illustrating how the electrostatic actuator has contracted, and FIG. 9 is a perspective view illustrating how the electrostatic actuator has extended.

The electrostatic actuator 20 contracts by first electrodes 1 and the second electrodes 2 being pulled with an electrostatic force, as illustrated in FIG. 8, when voltages having different polarities are respectively applied to the first electrode film 11 and the second electrode film 12.

On the other hand, the electrostatic actuator 20 extends by the first electrodes 1 and the second electrodes 2 repelling each other with an electrostatic force, as illustrated in FIG. 9, when voltages having the same polarity are respectively applied to the first electrode film 11 and the second electrode film 12.

Figure 10:
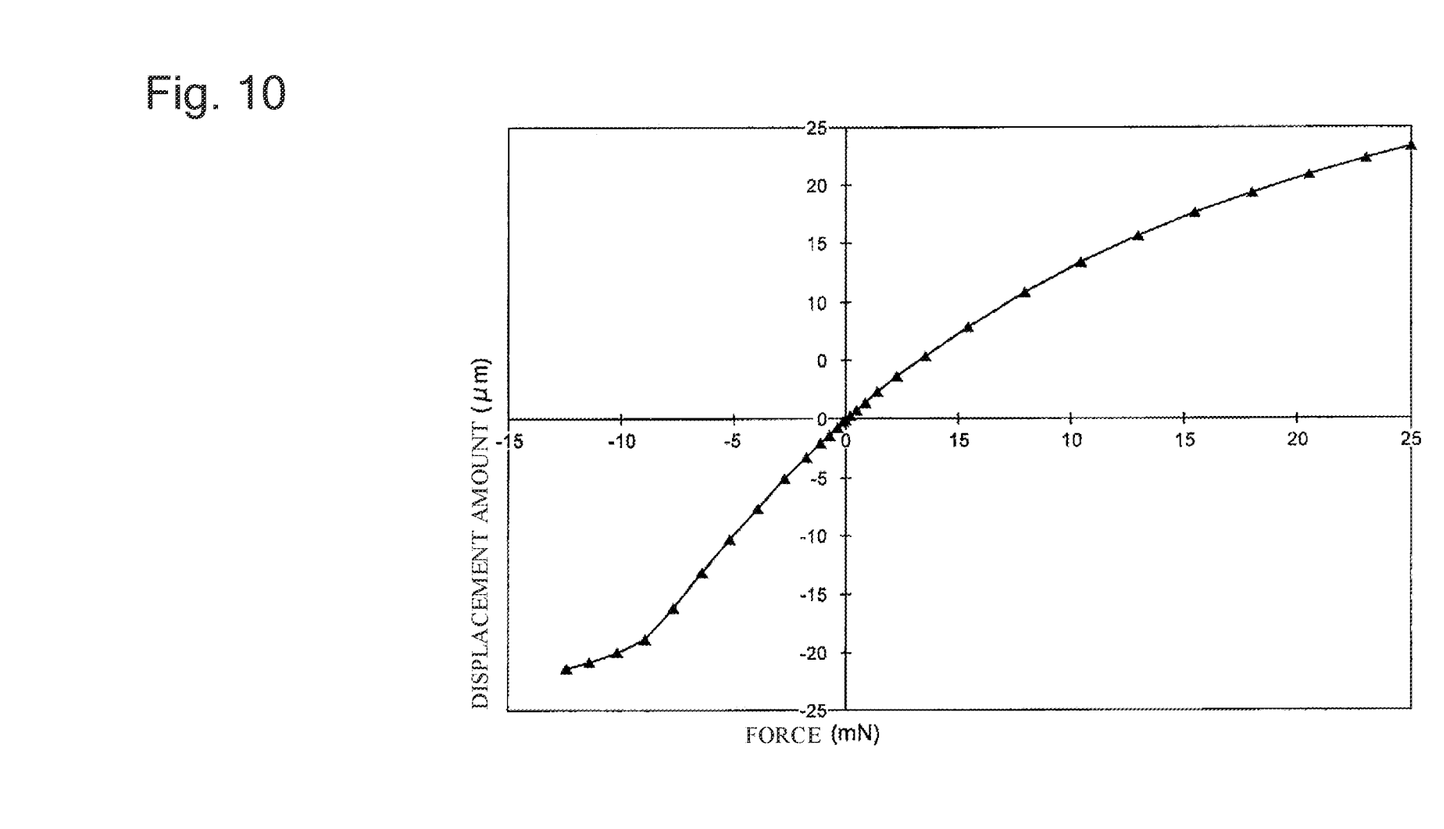
FIG. 10 illustrates a graph of a spring characteristic of the electrostatic actuator.

FIG. 10 illustrates a graph of a spring characteristic of the electrostatic actuator according to the second embodiment. In the figure, a vertical axis represents a spring constant in a unit of mN, and a horizontal axis represents a displacement amount at one end 13 or the other end 14 in a unit of μm.

The electrostatic actuator 20 has a structure in which a spring constant is small in a driving region where a displacement amount at the one end 13 or the other end 14 is small and a spring constant is large in an overload region where a displacement amount at the one end 13 or the other end 14 is large, as illustrated in FIG. 10. An ideal spring characteristic, like in a disc spring, is obtained when a ratio of the spring constant in the driving region to the spring constant in the overload region is five times or more.

Although the present invention has been described above based on the embodiment, the present invention is not limited to this. Although the second electrode film 12 is alternately mountain-folded and valley-folded in a direction in which the second electrode film 12 extends in a ribbon shape in the above-described embodiment, for example, the present invention is not limited to this. The second electrode film 12 may be repeatedly spirally folded in the same direction in a direction to extend in a ribbon shape, like the first electrode film 11 according to the first embodiment.

REFERENCE SIGNS LIST

1 . . . First electrode
1a . . . End electrode
1b . . . Intermediate electrode
2 . . . Second electrode
3 . . . Hinge section
3a . . . Outer hinge section
3b . . . Inner hinge section
4 . . . Hinge section
5 . . . Outer section
6 . . . Inner section
10 . . . Electrostatic actuator
11 . . . First electrode film
11a . . . Distal end
12 . . . Second electrode film
13 . . . One end
14 . . . Other end
20 . . . Electrostatic actuator

The invention claimed is:

1. An electrostatic actuator comprising a ribbon-shaped first electrode film and a ribbon-shaped second electrode film, wherein
    a plurality of first electrodes formed of the first electrode film and a plurality of second electrodes formed of the second electrode film are folded and laminated between one end and another end of the electrostatic actuator,
    the plurality of first electrodes include a pair of end electrodes that are respectively positioned at the one end and the other end when the first electrode film and the second electrode film are laminated and at least one intermediate electrode that is positioned between the pair of end electrodes when the first electrode film and the second electrode film are laminated, and
    the first electrode film has portions corresponding to the pair of end electrodes being adjacent to each other in a direction in which the first electrode film extends in a ribbon shape and has a portion corresponding to the at least one intermediate electrode being not positioned between the portions corresponding to the pair of end electrodes in a straight ribbon-shaped state before being folded.

2. The electrostatic actuator according to claim 1, wherein the first electrode film is repeatedly folded in a same direction in a direction to extend in a ribbon shape so that the at least one intermediate electrode is formed between the pair of end electrodes.

3. The electrostatic actuator according to claim 2, wherein the first electrode film is repeatedly folded in the same direction in a direction to extend in a ribbon shape so that the plurality of intermediate electrodes overlap one another.

4. The electrostatic actuator according to claim 1, wherein the at least one intermediate electrode is folded in a zigzag shape in a direction to extend in a ribbon shape so that the plurality of first electrodes overlap one another.

5. The electrostatic actuator according to claim 1, wherein the second electrode film is folded in a zigzag shape in a direction to extend in a ribbon shape so that the plurality of second electrodes each passing between the first electrodes formed of the first electrode film are formed.

6. The electrostatic actuator according to claim 1, wherein a distal end of the first electrode film is bonded to the second electrode film at an intermediate position between the one end and the other end.

* * * * *